US011227174B1

(12) United States Patent
Alves

(10) Patent No.: US 11,227,174 B1
(45) Date of Patent: *Jan. 18, 2022

(54) LICENSE PLATE RECOGNITION

(71) Applicant: James Alves, San Diego, CA (US)

(72) Inventor: James Alves, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,700

(22) Filed: Jun. 10, 2019

(51) Int. Cl.
*G06K 9/32* (2006.01)
*G06K 9/46* (2006.01)
*G06F 16/51* (2019.01)
*G06F 16/583* (2019.01)

(52) U.S. Cl.
CPC ............ *G06K 9/325* (2013.01); *G06F 16/51* (2019.01); *G06F 16/5846* (2019.01); *G06F 16/5854* (2019.01); *G06K 9/46* (2013.01); *G06K 2209/01* (2013.01)

(58) Field of Classification Search
CPC ...... G06K 9/325; G06K 9/46; G06K 2209/01; G06F 16/5846; G06F 16/51; G06F 16/5854
See application file for complete search history.

(56) References Cited

U.S. PATENT DOCUMENTS

| | | | |
|---|---|---|---|
| 6,084,595 A * | 4/2000 | Bach | G06T 17/00 345/431 |
| 6,473,517 B1 | 10/2002 | Tyan et al. | |
| 8,059,868 B2 * | 11/2011 | Matsumoto | G06K 9/00 382/105 |
| 8,447,112 B2 | 5/2013 | Paul et al. | |
| 8,483,440 B2 | 7/2013 | Fan et al. | |
| 8,509,486 B2 | 8/2013 | Hsieh et al. | |
| 8,781,172 B2 | 7/2014 | Kozitsky et al. | |
| 8,798,325 B2 | 8/2014 | Wu et al. | |

(Continued)

OTHER PUBLICATIONS

Gilly, Divya, Raimond, Kumudha, a Survey on License Plate Recognition Systems, International Journal of Computer applications, vol. 61, No. 6, p. 34 (2013).

(Continued)

*Primary Examiner* — Emily C Terrell
*Assistant Examiner* — Molly Delaney
(74) *Attorney, Agent, or Firm* — Mark Wisnosky

(57) ABSTRACT

A license plate recognition process is described that includes automated image analysis integrated with human review and a definition of a plate grammar of license plate visual elements that are required to prepare a database search index that enables selection of a particular license plate, from a known population of all possible license plates issued for each and every jurisdiction of interest. The plate grammar includes visual elements that may be searched by both automated image analysis and by a human reviewer. The process includes creation of a question that guides a human reviewer into providing required information regarding a selected plate grammar element that is not identified by computerized image analysis. Integration of a manual review process within an automated process as opposed to manual review solely at a failed completion of the automated process is included. Methods are presented for creation of queries for manual review that take into account the skill and availability of the manual reviewer as well as optimizing for a shortest path to completion of the recognition of the license plate through the database search index.

5 Claims, 8 Drawing Sheets

(56) References Cited

U.S. PATENT DOCUMENTS

| | | |
|---|---|---|
| 9,092,979 B2 | 7/2015 | Burry et al. |
| 9,158,995 B2 | 10/2015 | Rodriguez-Serrano et al. |
| 9,384,423 B2 | 7/2016 | Rodriguez-Serrano et al. |
| 9,405,985 B1 * | 8/2016 | Burry ................... G06K 9/3258 |
| 9,405,988 B2 * | 8/2016 | Alves ................... G06K 9/3258 |
| | | 382/105 |
| 9,536,315 B2 | 1/2017 | Bulan et al. |
| 9,563,814 B1 | 2/2017 | Wilbert et al. |
| 10,963,719 B1 * | 3/2021 | Hantehzadeh ........... G06K 9/32 |
| 2008/0212837 A1 * | 9/2008 | Matsumoto et al. ....................... |
| | | G08G 1/0175 |
| | | 382/105 |
| 2009/0208060 A1 | 8/2009 | Wang et al. |
| 2012/0275653 A1 | 11/2012 | Hsieh et al. |
| 2013/0129152 A1 * | 5/2013 | Rodriguez Serrano ..................... |
| | | G06K 9/00791 |
| | | 382/105 |
| 2014/0285315 A1 * | 9/2014 | Wiewiora ................ G07C 9/37 |
| | | 340/5.53 |
| 2014/0301606 A1 * | 10/2014 | Paul ..................... G06K 9/3258 |
| | | 382/105 |
| 2015/0049914 A1 * | 2/2015 | Alves ..................... G06K 9/033 |
| | | 382/105 |
| 2016/0299897 A1 * | 10/2016 | Silva ..................... G06F 16/248 |
| 2017/0372161 A1 * | 12/2017 | Almeida ............. G06K 9/00785 |
| 2018/0253617 A1 * | 9/2018 | Tsai ................... G06K 9/00979 |
| 2021/0097306 A1 * | 4/2021 | Crary ................ G06K 9/00785 |

OTHER PUBLICATIONS

Sharma, Vandini et al. Automatic License Plate Recognition Usig Optical Character Recognition and Template Matching on Yellow Color License Plate. International Journal of Innovative Reseach in Science, Engineering and Technology, vol. 3, Issue 5, (May 2014).

* cited by examiner

LICENSE PLATE RECOGNITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Technical Field

The present invention relates to License Plate Image Recognition systems and methods for reading large numbers of images of license plates efficiently and at high accuracy.

Related Background Art

Various applications, such as all-electronic toll collection and certain law enforcement activities, utilize computerized image processing systems augmented by human review to accurately and efficiently convert large numbers of license plate images captured each day into the specific text search index strings needed to uniquely recognize, through the database search index, a license plate in databases maintained by the organizations that issue license plates. The process of converting a license plate image into these database index strings is called "reading" or "recognizing" the license plate. The issuing organization or jurisdiction is typically imprinted in small text along the very top (or bottom) of the plate. Examples include the name of a governmental body, like a specific State, a particular Country, or a branch of the US Government like the US Military or the Department of State that issues diplomatic plates. For many jurisdictions and license plates, the unique index into the organization's database can be completely defined from the jurisdiction name and a string of large characters imprinted along the middle section of the plate. For these simple-to-read plates the background graphics, or any other additional small text and graphics that appear on these plates can be ignored because these visual elements of the plate are not germane to generating the plate's unique database index. However, other issuing organizations have created license plates with highly complex relationships between how the database index must be formed from the graphical designs of their plate. Such license plates require identifying additional textual and/or graphical elements imprinted on the plates in order to decide how to formulate the unique database search index for the plate. "Identifying" includes both determining whether a particular element is present, as well as, identifying the content of any found element. For most locations, within North America, for example, a license plate recognition system must be able to form the database search index from images of license plates from 10's to 100's of jurisdictions where each jurisdiction has its own set rules, and, complexity of license plate design. The license plate recognition systems must be able to do this for thousands of license plates imaged each day and recognize these plates at error rates that are less than a few parts per thousand.

Current systems for license plate recognition use both automated means and human review to create the database index. The automated means include optical character recognition, as well as, image analysis to determine character strings and graphics required to create the database search index. However, the automated means still requires knowledge as to the plate design and whether the plate is a simple one that may be fully characterized by OCR of the main text on the plate or is a complex design requiring the system to recognize the additional graphics/text on the plate. Current systems use human review of the license plate images, typically when the automated systems fails to confidently produce a database search index. The human review is used to either generate database indexes for plates that the automated system did not generate a result at all or as a check or correction to the low confidence reads generated by the automated system. Prior systems do not guide the human reviewer as to entering critical recognition data with simple questions that only require them to compare artificially generated plate element images to the actual plate image that is trying to be recognized. The human reviewer must be skilled in recognizing plates from a multitude of jurisdictions and remember a great deal of detailed knowledge about what aspects of the license plate image are germane to the recognition process and how to correctly form the database index for the plate or decide that critical plate information is not visible in the image and thus accurate recognition is not possible. Human reviewers, even if highly trained, are slow, expensive, and, frequently make errors when presented with complex license plates to recognize. None of the current image processing license plate recognition systems are fully capable to generate a correct database index applicable to all license plates issued in North America. This is true of any location, worldwide, where a large number of different jurisdictions are encountered, each with their own set of designs and rules to create an accurate database index.

There is a need for a license plate recognition system that can be applied to a large number of jurisdictions each having their own license plate designs ranging from the simple to the complex.

There is a need to increase human reviewer accuracy and efficiency when entering data required for generating proper database indexes.

There is a need for a license plate recognition system that effectively combines automated recognition with human review, and, simplifies the task of human reviewers, such that they do not need to be trained to know how to enter accurate database indexes given all the highly complex jurisdiction dependent rules for recognizing license plates from all applicable jurisdictions and the multitudes of plate designs created by these jurisdictions.

The license plate recognition system must be capable of error rates in the low part per thousand or better and provide such rates across hundreds of thousands of license plate images processed per day.

DISCLOSURE OF THE INVENTION

In a first embodiment, a grammar for license plate recognition is defined, that both computers and a human reviewers can readily parse in imagery of license plates, and, consists of a compact simple set of visual elements whose values physically appear on the license plate, and taken together, uniquely characterize every single license plate that is of interest to be recognized. The set of visual elements is complete in that, if all the values of these visual elements are known for a plate, then the unique database search index defined by the issuing agency for the plate can always be determined. These visual elements are carefully chosen in such a way as to be readily identifiable, if present, by both human reviewers and machine processing. The elements are chosen so that their individual presence, or absence, is easily tested by both computers and human reviewers of an image of the license plate. The visual elements are chosen to enable the correct database index, as defined by the plate's issuing jurisdiction, to be automatically generated solely from the list of visual element found, or not found, and, their identified values within a plate image. The visual elements are each generically defined such that they can be easily understood and identified by human reviewers, without them requiring prior knowledge of all the possible values that any given element may appear on a license plate.

In another embodiment, the automated license plate recognition system is constructed on the basis of a set of rules that relate whether the visual elements are present in a plate image, and, if so, the content of the elements, to the database search index used in each of many possible jurisdictions.

In another embodiment the automated license plate recognition system includes preparing a set of unambiguous, easy to answer, questions based upon the visual elements, that are presented to a human reviewer, and, that guide the human reviewer to provide information regarding any particular visual element(s) that the automated system is, for whatever reason, unable to automatically identify with a required level of certainty/accuracy.

In another embodiment the questions are presented to the human reviewer as an integrated part of the license plate recognition system.

The license plate recognition system and the methods disclosed have the advantages of:

1) Human reviewers do not need to be trained to become experts at understanding all the complex ways multiple jurisdictions have defined database indexes across the myriad of plate designs they issue. They only need to recognize a limited set of visual elements that may appear on the license plate, and, in a preferred embodiment are prompted by questions automatically generated as to allowable content of each of the visual elements. Accuracy of human data entry goes up significantly since a reviewer only has to recognize and enter a relatively small number of pre-defined data elements that are visually present in their entirety on the license plates that they are reviewing.

2) Errors of omission are eliminated by having the system automatically make specific requests to look for the specific element that are known to be essential for ensuring that the correct database index will be generated given the visual elements currently entered for the plate image and the system's pre-stored knowledge about all the possible visual elements that may be present on plates issued by the jurisdictions identified for the plate being reviewed.

3) Accuracy of the index generated for a plate image is significantly increased for complex plate designs by not having humans directly generate the index but using a pre-stored knowledge database that defines how to convert the visual element read of the plate into the correct database index defined by the plate's Jurisdiction.

One embodiment of a license plate recognition system and method includes four elements:

1) A limited, but complete set of visual elements that may appear on a license plate, and, whose values fully determine the database index string for any plate design, including all jurisdictions, for which license plate recognition is required.

2) A set of rules that are implemented on a computer that convert information about these visual elements for any given plate design into a complete and unique index string for each and every database maintained by the organizations that issued the plate.

3) A set questions, implemented by a computer, that guide human reviewers, through computer generated queries, to look for and enter whatever visual elements may be missing in order to fully read the plate, based at least in part, on the visual elements previously identified (either automatically or manually).

4) Integrate human review into the automated, computerized process, such that a human reviewer is prompted to provide information as to a missing visual element, and, once the human has responded, the computer continues the automated processing of the license plate image to identify remaining visual elements, and, produce the database search index.

The license plate grammar, rules to create the index, and, automated presentations of particular questions to identify particular visual elements of a license plate enables use of less skilled human reviewers, who can provide the missing information quicker and more reliably than asking manual reviewers to provide the answer for a general question of "identify the plate" when automation fails. This approach is also much more reliably accurate than asking manual reviewers to confirm lower confidence automated answers. Presenting uncertain automated answers to manual reviewers is known to bias manual reviewer answers to those presented for confirmation rather than asking the reviewer to make a choice between more than one potentially correct answers. In preferred embodiments the questions have multiple choice answers. In some embodiments the choice of responses available to the manual reviewer are: "DEFINITELY OPTION 1", "DEFINITELY OPTION 2", "DEFINITELY NOT EITHER", "MAYBE ONE OF THEM, BUT NOT POSSIBLE TO TELL FOR SURE", and, "I'M NOT SURE HOW TO ANSWER". The system is an improvement over prior art in that it allows full exploitation of known shortcomings of the automatic process, optimal use of uncertainty in automatic results, optimal use of manual reviewers by only seeking definitive answers to simple well defined questions, optimal use of manual reviewers by focusing their attention only on missing or ambiguous plate image information or information for which the automated system has low confidence in its result. In a preferred embodiment, the computer generates images that are specific for the question, and, allow the manual reviewer to make quick reliable decisions based on comparing the computer generated images to the plate image that is trying to be recognized. In one embodiment the questions are targeted at the experience or training level of individual human reviewers. In another embodiment the automated recognition system with integrated human review is optimized to find a shortest path to license plate recognition. Although described as used in plate recognition systems for electronic toll collection, the methods may also be applied to plate images acquired through a handheld device, such as a camera or cellular telephone, and, either processed locally on a handheld computing device, as may be included in a typical cellular telephone, or, communicated through cellular or other means to a server, remote from the handheld device, where the methods described here are applied.

MODES FOR CARRYING OUT THE INVENTION

The invented system includes hardware and processes to allow accurate reading of both complex and simple North American license plate designs from imagery taken of vehicles either moving at normal traffic speeds on a roadway or when the vehicle is stationary but the camera imaging the license plates is mobile or fixed.

Figure 1:
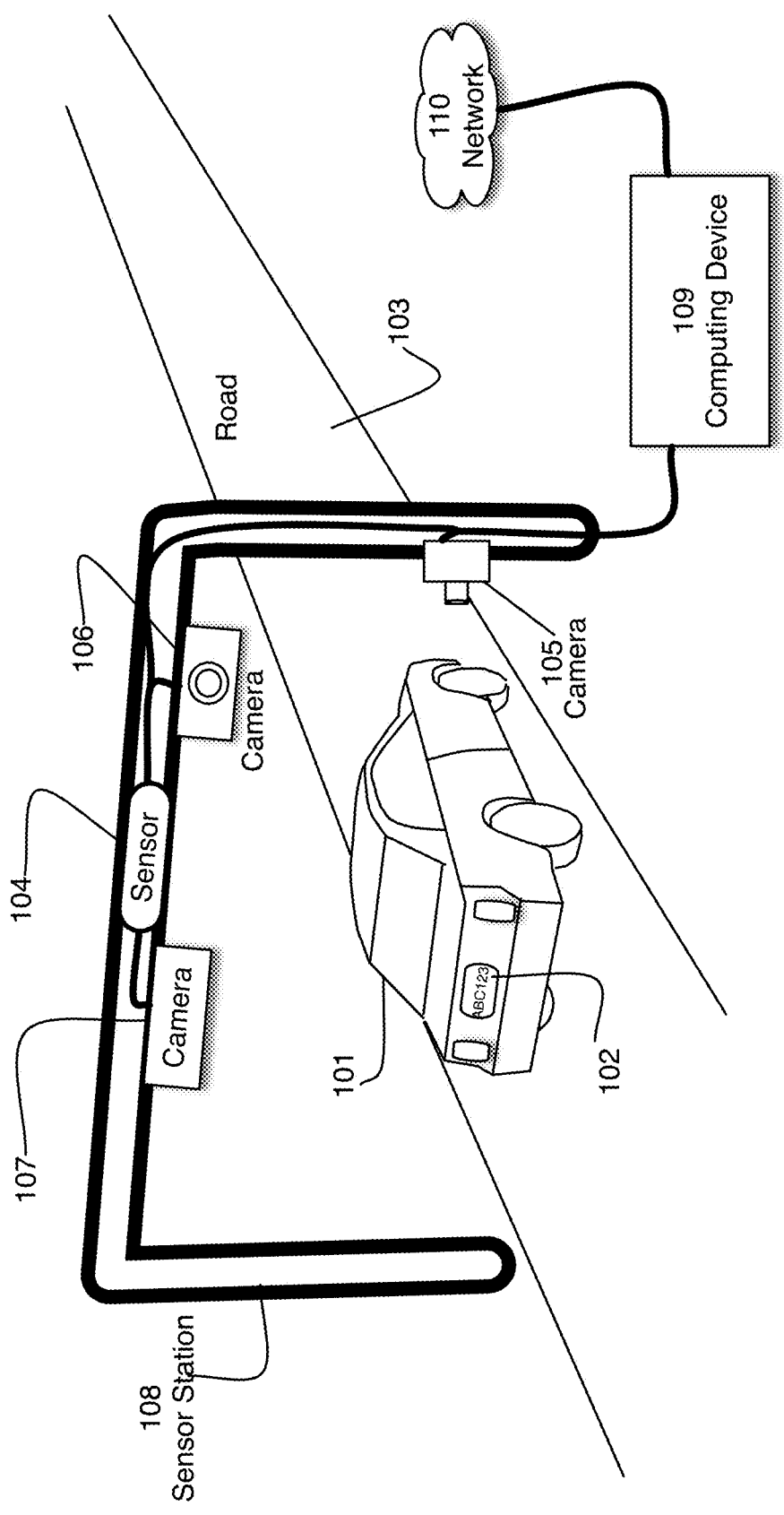
FIG. 1 is a block diagram of typical data acquisition hardware features for practicing the invention.

Referring now to FIG. 1 a license plate data acquisition system is shown. A vehicle 101, having a license plate 102 is traveling along a road 103. As the vehicle passes a sensor station 108 it is photographed by one or more cameras 105, 106, 107. The cameras may be positioned to acquire images of the front of the vehicle, the rear of the vehicle and the sides of the vehicle or all of the above. In one embodiment the acquisition of the image is triggered by a sensor 104 that detects the presence of the vehicle such as a radar sensor. In another embodiment presence of the vehicle is detected by motion in the acquired video images form the cameras. In another embodiment the vehicle is detected by breaking a light sensor. In another embodiment the vehicle is detected using a magnetic sensor in the roadway. The detector may be an optical sensor or radar sensor or may be motion detection within a camera system. The cameras may acquire images just as a vehicle passes or may acquire images continuously and select those images where the vehicle/plate is detected. The sensors and cameras are connected to a computing device 109 that is further connected to a network 110 for sending acquired images to data processors for license plate recognition. In one embodiment the license plate recognition is accomplished locally. In another embodiment the data is sent to a remote location and license plate recognition is done remote from the sensor system. In other embodiments the sensors may further include sensors that read radio frequency identification tags on a vehicle and make measurements of the vehicle including vehicle size, shape and weight. In these cases, the sensors may include radar sensors, reflected structured light sensors and weight sensors such as strain gauges built into the pavement over which the vehicle is passing.

In another embodiment (not shown), there are multiple sensor stations. The sensor stations may acquire images independently or in a coordinated fashion and are interconnected through a local network or through the Internet to a processor that may further include program storage including license plate recognition processing and local storage of data and database information related to license plate recognition. The system may be further networked to remote processors for license plate recognition and billing. The connection may be through any wired or wireless network as known in the art and the Internet.

Figure 2:
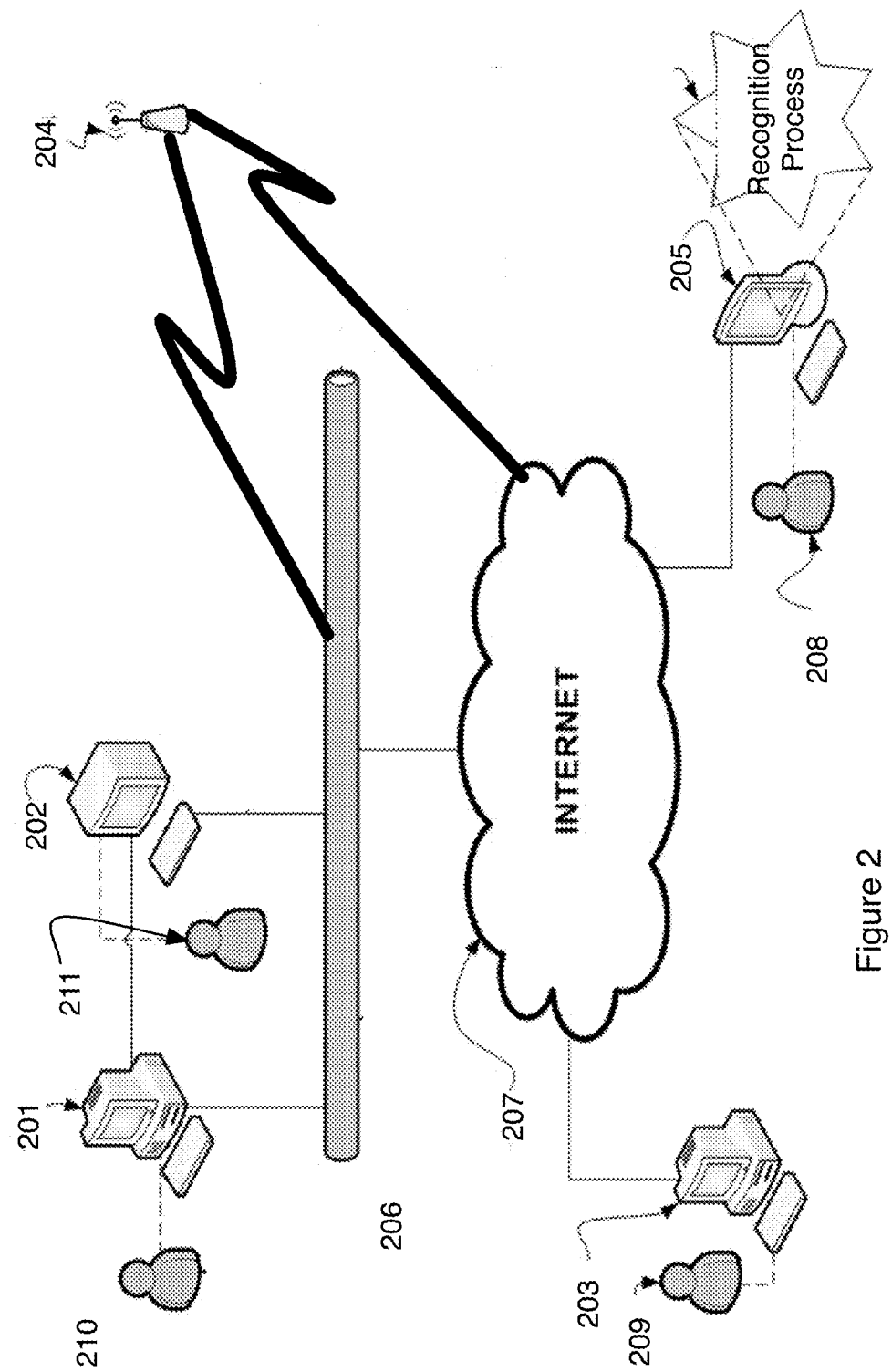
FIG. 2 is a block diagram of typical computer processing hardware for practicing the invention.

Referring to FIG. 2 an exemplary hardware computing system used to practice the invention is shown. A data acquisition system 204 sends data acquired from a passing car to a computing system 205. The data acquisition system, such as that described in FIG. 1, includes a camera for taking an image of the license plate on the vehicle. In another embodiment the data acquisition system further includes cameras for taking photographs of both the license plate and the vehicle. In another embodiment the data acquisition system includes both visual and other vehicle identification measures such as radio frequency identification of tags on a passing vehicle. The system further includes computing systems 201, 202, 203, 205. The computing system includes components known in the art for computing systems, including a user interface, electronic memory storage, electronic processors and input/output ports to communicate electronically with other devices. The connection between the data acquisition system 204 and the computing systems 201, 202, 203, 205 may be wired or wireless and may be through a local network 106 or through the Internet 107 or both. At least one 205 of the computing systems are programmed with license plate optical character recognition software that analyzes the data from the data acquisition system 204 and identifies the characters on the license plate. Another of the computing devices 203 may be used for manual review of the images from the data acquisition system to verify the accuracy of the automated recognition. Another computing device 202 may include database and/or links to databases. Nonlimiting examples of the databases include a database of vehicle images whose identity has been confirmed, a database of vehicle features other than the characters of the license plate, a database of character string indices vehicle registration character data that identifies owners of vehicles linked to the character strings and graphical data on the license plates of the vehicles, a database of billing data showing prior recognition history of a vehicle on the roadway where the data acquisition system 204 is located as well as payment and complaint history, if any, arising from erroneous billing. Other of the computing devices 201 may include billing software that bills the owners of vehicles identified on the roadway for tolls related to roadway use, or for infractions such as speeding on the roadway. The system further includes operators 208, 209, 210 and 211. The operators may operate at the computer that includes the recognition process or may operate at computers linked to the recognition process computer via a local network, or through the Internet. The multiple computers in the system 201, 202, 203, 205 may be programmed to display data from the remote sensor 204 for review by operators 208, 209, 210, 211. In one embodiment all operations are on a single computer with a single operator for review (for example just 205, 208). In another embodiment as shown a plurality of computers and operators are included. The plurality of computers and operators may be centrally located at a single site or dispersed across multiple sites linked by the internet 207 or other network system 206 including both intra and internet and including both wired and wireless means of communication. The recognition process includes automated analysis of the license plate image, and, creation of a database search index for the license plate image, and, a decision system to include manual review by one or more operators 208-211. In one embodiment at least one of the operators/computers is used for billing of the owner of the plate recognized as passing the sensor 204. Bills may be sent to the owners of the plate either electronically or through printing and regular mail. The billing system further includes information related to paying of the bills by customers. This information may be obtained through electronic links to banking systems (not shown). The computing systems include storage for transaction data that includes identification of passing vehicles, identification of owners of passing vehicles through motor vehicle registration systems, billing and payment records for the transactions.

Although described as used in a toll system, the methods may also be applied to images acquired through a handheld device such as a camera or cellular telephone and either processed locally on a handheld computing device as may be included in a typical cellular telephone or communicate through cellular or other means to a server where the methods described here are applied. In another embodiment the images are acquired by a handheld computing device such as a cellular telephone or portable computer or tablet and the methods described are either applied locally on the handheld device or data is transmitted to a remote server for processing.

Figure 3:
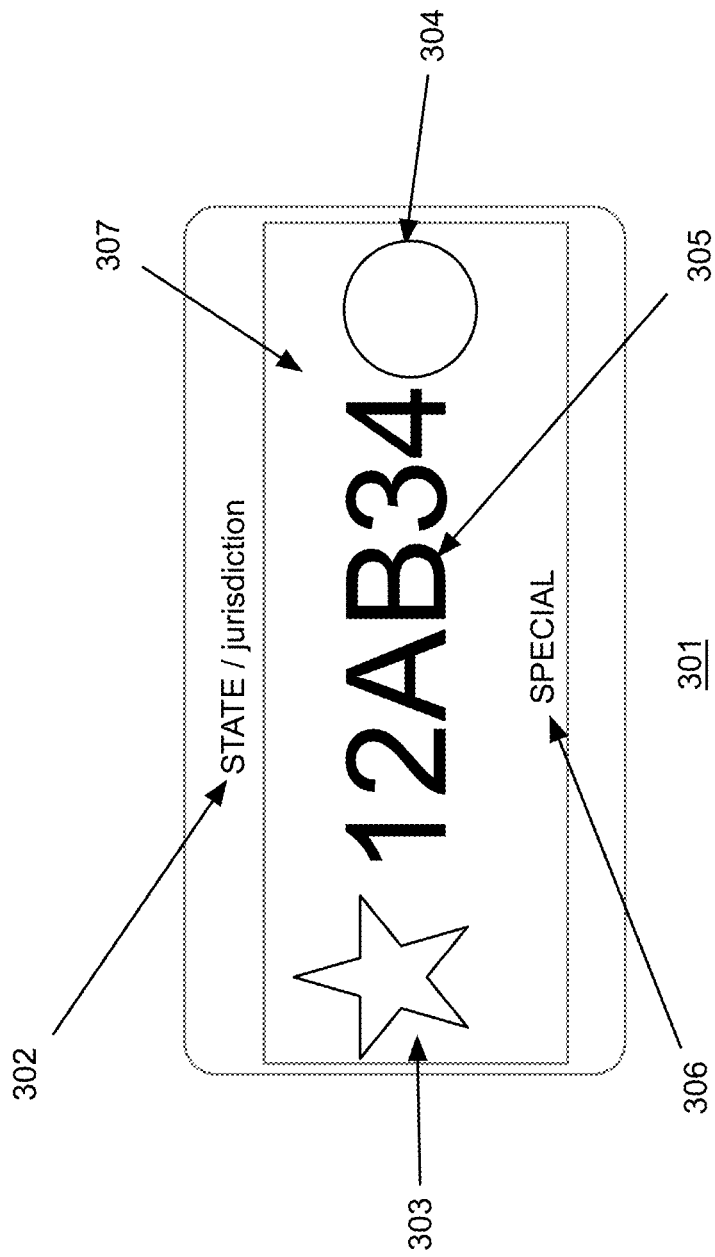
FIG. 3 is a diagram of a license plate showing plate grammar visual elements of the present invention.

FIG. 3 shows an invented plate grammar of license plate visual elements required for full recognition of the license plate. The license plate image 301 includes visual elements 302-307 that are sufficient, when coupled with a set of rules, to create an index that is uniquely associated with a particular license plate in an agency generated database of license plates. In one embodiment, the visual elements are defined generically such that a human reviewer will know that the element appears in a certain general locations on the plate and has particular nominal characteristics. The visual elements in the plate shown in FIG. 3 include a jurisdiction 302, a prefix 303, a suffix 304, a text string 305, a series string 306, and a background 307. The automated license plate recognition system includes defining a subset of these visual elements, or, if necessary, a super set, including additional elements that once defined, and, whose content is known will enable, through a set of pre-defined rules, to create the correct database search index for each and every license plate issued by a particular jurisdiction, and, for a plurality of jurisdictions. Note that a human reviewer, is able to identify each of the visual elements 302-307, without prior knowledge of the jurisdiction and which elements are required to make a complete set. The required set of visual elements 302-307 are interdependent. For example, in some jurisdictions, the complete set of visual elements required for creation of all possible license plate database search indexes, may include just the jurisdiction 302 and the text string 305. This may be true even if other visual elements are present in the image of the license plate. The automated license plate recognition system includes defining the minimum set of these visual elements that is required to create all the database search indexes used by each jurisdiction of interest. The allowed values for each of the visual elements is also interdependent. For example, a value for a jurisdiction 302, will in some cases, limit the allowed values for all remaining visual elements 303-307, including whether they are to be found at all on plates from that jurisdiction. The interdependence and allowed values of the visual elements is used in the automated license plate recognition system to automatically determine values for a first visual element from the measured values for a second visual element.

As a non-limiting example, perhaps the automated license plate recognition system is unable to confidently determine the value for the jurisdiction from the license plate image. However, the automated license plate recognition system can confidently determine the value for the prefix visual element 303 found in the same image, and, the pre-coded limited set of allowed values for the prefix visual element dictates the jurisdiction. The jurisdiction can then be confidently assigned to the image without the ability to identify the value for the jurisdiction on the actual license plate image 301.

In one embodiment the image of the license plate is divided into physical regions 302-307 on the face of the license plate 301. The example shown is for a typical license found in North America but is applicable to plates issued world-wide. The visual elements and their location are shown here for example purposes and may vary somewhat from jurisdiction to jurisdiction. Even within a jurisdiction there may be particular classes of plates that vary the location of the visual elements. However, the databases accessed by the automated license plate recognition system will include types and locations of all elements for all plates issued within a jurisdiction. In one embodiment the nominal plate grammar visual elements include:

Jurisdiction 302, almost always present but often covered or obstructed by license plate frames.

Prefix 303, if present, sometimes used to recognize plates issued to select groups of vehicle owners (like handicapped persons, or sports enthusiasts) or to identify specific types of vehicle classes Registration string 305 almost always required, except for some rare one-of-a-kind plates.

Suffix 304, similar to prefix 303 but may be used for recognition of different groups of affiliated vehicle owners, or, otherwise to distinguish a subset of license plates issued by the jurisdiction Series 306 often used on limited edition plates, or issued to vehicles used for specific purposes or their owners belong to certain organizations.

Background graphic description 307, all plates have a background. In some cases, background includes scenic images or other images that are an indication of a special plate such as a vanity plate. In some cases, identification of the background graphic description (images and color) is required to uniquely determine the plate's unique database search index. Often the background graphic description can be used as an alternate way to identify a jurisdiction if the jurisdiction region 302 is obscured or unidentifiable in the image.

The plate grammar includes defining a set of visual elements that are both human and machine readable. In preferred embodiments the visual elements include textual information. In preferred embodiments, defining a set of visual elements includes a parsing of regions of the license plate image where the visual elements are located. Identification of all plate grammar elements may be required to uniquely define the database search index. Identification of plate grammar visual elements may include whether particular elements are present or not on the license plate, and if present the content or value for that visual element. No single visual element, necessarily, uniquely defines the plate's database search index. For example, some jurisdictions use the identical string 305 on plates that differ in the presence or values for other plate grammar elements. But for some jurisdictions the jurisdiction 302 and the character string 305 will enable creation of all possible database search index for that jurisdiction. The latter were described earlier as simple plates. The automated license plate recognition system, described here, provides the complete set of visual elements for all jurisdictions for both simple, and, complex plates (where more than two visual elements must be defined for completeness).

The license plate image 301 almost always includes a jurisdiction region 302. The jurisdiction indicates the governmental agency that issued the license plate. Non-limiting examples include a State within the United States, a province within Canada, the U.S. government, Indian Tribes, and so forth. For any given jurisdiction the location of the jurisdiction element typically has a fixed location or a limited number of locations on the plate. The physical locations on the licenses plate image 301, and, the allowed values, if there is a limited set of values, for all plate grammar elements are stored in a database or otherwise encoded in software. A set of rules is provided such that once values for each of the required visual elements is known, the database search index of all license plates in the jurisdiction can be uniquely determined.

In one embodiment, the automated license plate recognition software will look exclusively in each physical region 302-307 of the license plate 301 for each of the visual elements. In another embodiment the license plate recognition software will present a cropped image of just a particular region 302-307, for manual review, with a simple question to the human reviewer as to whether a specific visual element is present or absent within the cropped plate image, and, if present, the value for the visual element. A "value" for a visual element may include a text string or an identified graphic. In another embodiment the license plate recognition system presents an image of the region of the plate where a particular element is located and a multiple choice selection of the allowed values for the element to be present in that region. In the example given the plate grammar includes 6 regions 302-307. In practice the plate grammar may include more or fewer regions of the license plate.

Figure 4A:
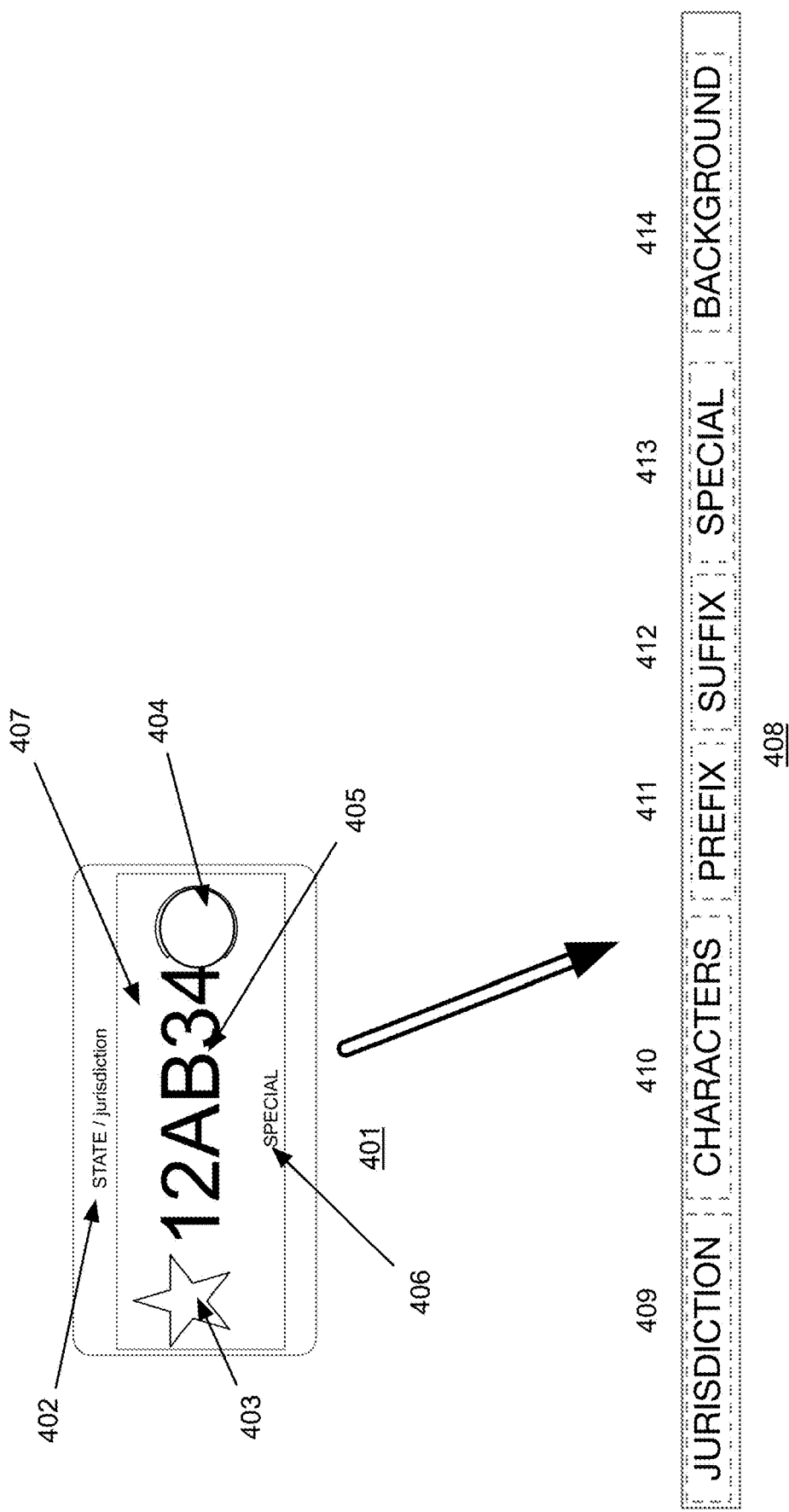
FIG. 4A is a diagram that illustrates an embodiment of rules for translation of the plate grammar visual elements values to an index string.

FIG. 4A shows how the plate 401 plate grammar, items 402-407, is converted through a set of rules to a search character string that is used in searching a jurisdiction's issued license plate database. Each of the plate grammar elements 401-408 are imaged. In one embodiment the rules include matching images of each plate grammar element found in a license plate image against a database of images with associated ascii characters. If positively identified, the associated ascii characters are inserted into an associated field 409-414 of the database search index 408. The contents 409-414 of the database search index 408 shown are for examples only. The characters of the database search index may or may not be human readable or present in the plate image. In a preferred embodiment the database search index characters are ascii characters.

Figure 4B:
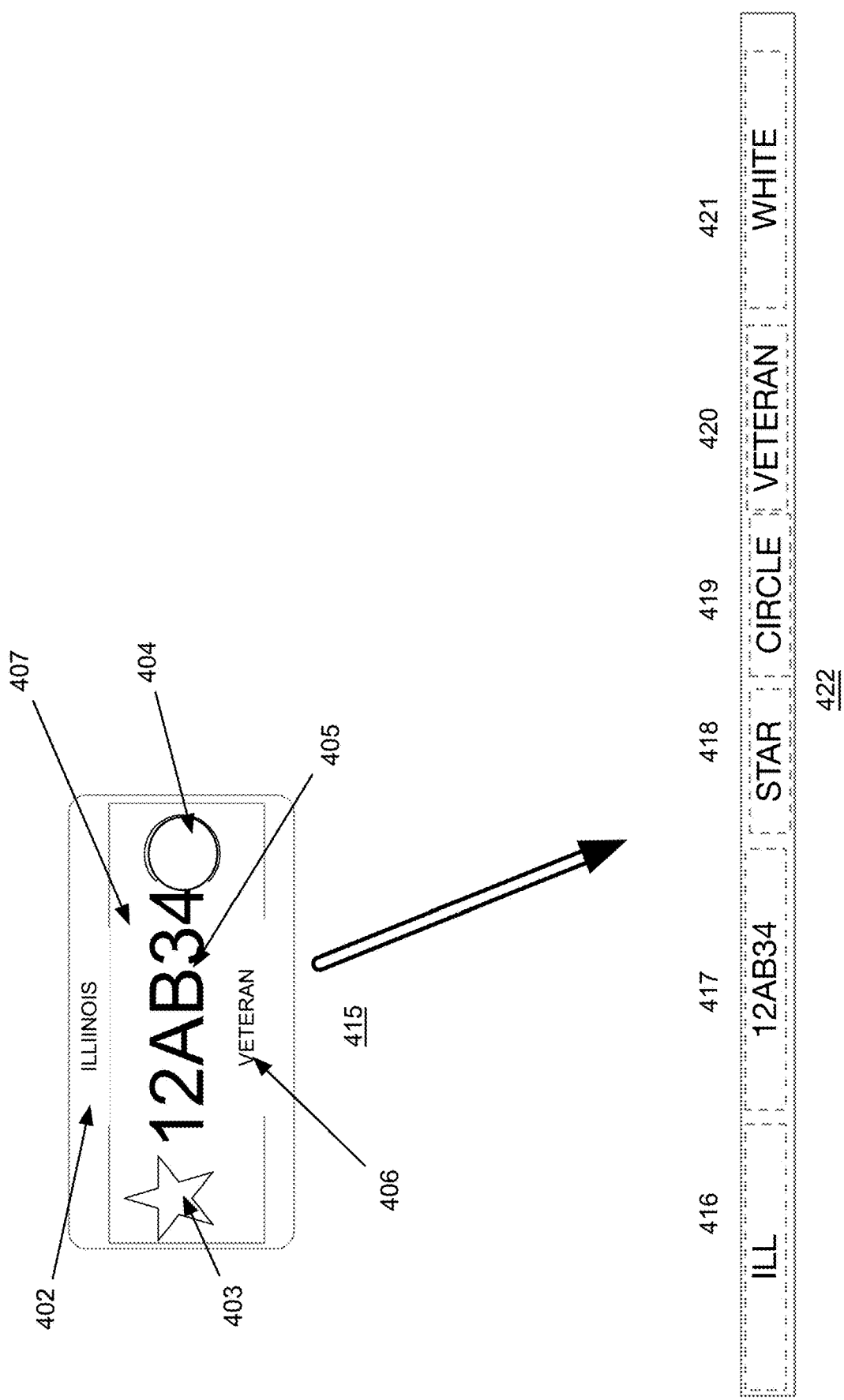
FIG. 4B is a diagram that illustrates applying the plate grammar and embodiment of rules to a particular license plate.

FIG. 4B shows specific example for a licenses plate image 415 results in the database search index 422. Here the jurisdiction 402 is identified as Illinois (ILL), the characters on the plate 405 are identified as 12AB34, the prefix 403 is a star, the suffix 404 is a circle, the series 406 identifies a plate of special recognition for a veteran and the background 407 is white. An example resulting search index string for such a plate would be the ascii string 415 as shown including the characters in the fields 416-421. The database search index can consist of fields 416-421 that are delineated by special characters or each field is a given length or count of ascii characters. The rules for translating the contents of the image elements 402-407 into the database search index 408 may be more complicated than as shown a one to one relationship. The jurisdiction may not be necessary in the database search index as the jurisdiction may be used to select a particular jurisdiction's license plate database and all information in the database applies to a single jurisdiction. The entries might not be as obvious a one to one mapping. For example, the rule translating the contents of each visual element may include a mathematical relationship and the database search index 408 is a numeric result of the mathematic relationship.

Figure 5:
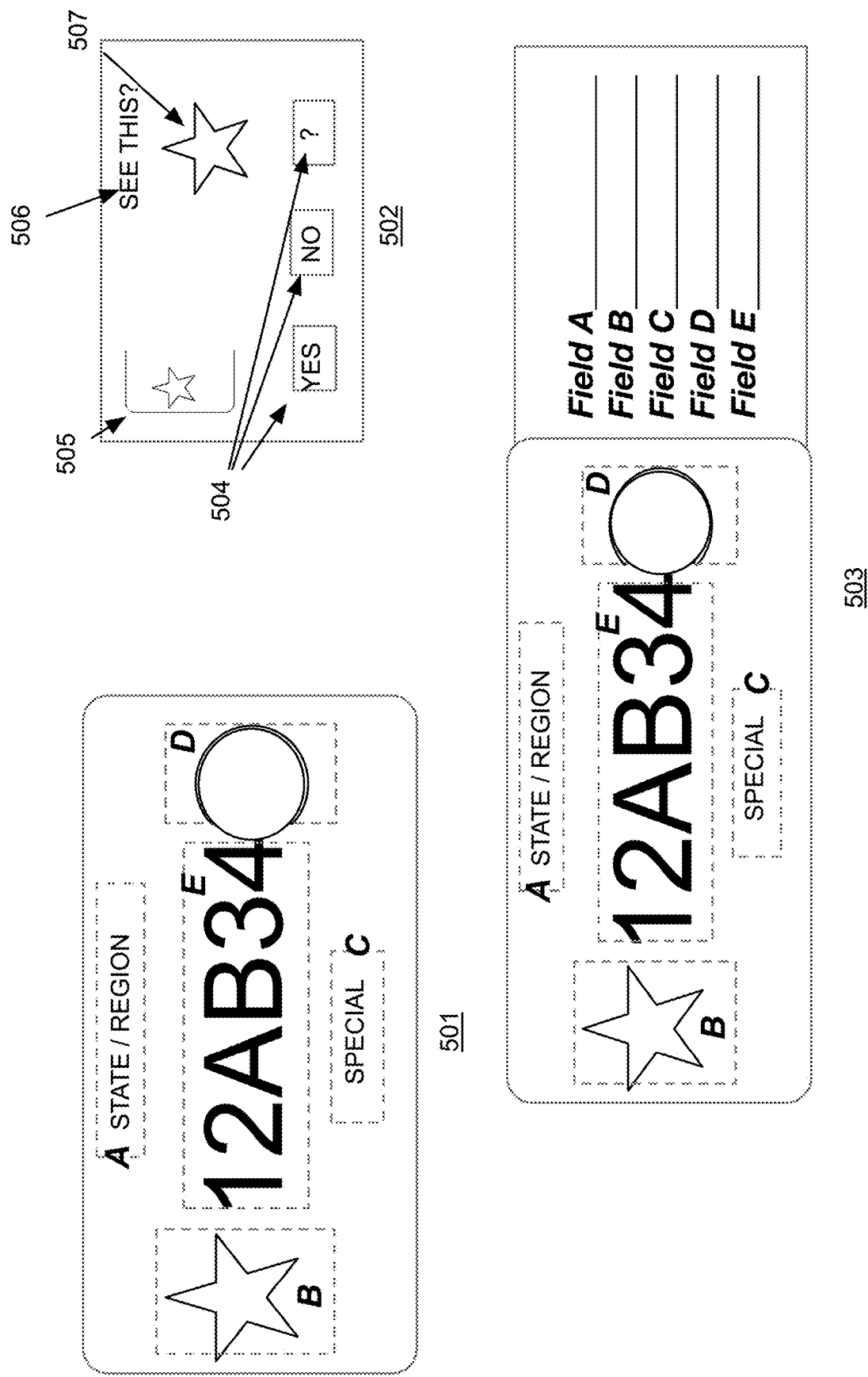
FIG. 5 is a diagram of using the plate grammar visual elements to generate questions for a guided manual review.

In another embodiment shown in FIG. 5 a set of questions are generated automatically by the license plate recognition system that prompts and guides the user to provide values for each of the visual elements of the plate grammar utilized by the plate's jurisdiction. Referring to FIG. 5, a license plate image 501 is shown divided into regions of the plate image 501, shown as dashed lines and labeled A-E. The regions are as discussed above and include a jurisdiction designation, A, through a registration string E. In one embodiment, a computer is programmed to present a screen display 502 to a manual reviewer. The screen display includes a new image 505 that includes just a portion of the plate related to the prefix element B and a question 506 as to whether a particular possible element 507 is seen in the image 505. The reviewer is given limited options for response. In the example shown, options for a response 504 include YES, NO and ? (for "I'M NOT SURE HOW TO ANSWER"). In one embodiment the questions are based upon the plate grammar visual elements, and, the reviewers are presented with a cropped image of a portion of the license plate, and, queried with limited response answers as to whether a particular plate grammar visual element is present, and, if so, its value. In some embodiments the choice of responses available to the manual reviewer are generally: "DEFINITELY OPTION 1", "DEFINITELY OPTION 2", "DEFINITELY NOT EITHER", "MAYBE ONE OF THEM, BUT NOT POSSIBLE TO TELL FOR SURE", and, "I'M NOT SURE HOW TO ANSWER". In the example 502 "YES" corresponds to a "DEFINITELY OPTION 1", "NO" corresponds to a "DEFINITELY OPTION 2" and "?" corresponds to "MAYBE ONE OF THEM, BUT NOT POSSIBLE TO TELL FOR SURE". In the example, the identification as to whether the symbol 507 in located in the field B is required for the automated license plate recognition system to uniquely identify the license plate 501. Such a simplified question might be prepared for a novice reviewer. In another embodiment a screen image 503 is prepared by the automated license plate recognition software that includes the image of the license plate with regions where particular elements, required for identification of the license plate are highlighted, shown with dashed lines, and the reviewer is queried as to what appears in each of the element fields A-E. A question so presented would be used with an experienced reviewer who would be aware of the allowed values for each of the required elements. In another embodiment (not shown), only the missing visual elements are highlighted. In another embodiment, the question to the reviewer would include a drop down list of allowed values for each of the field elements A-E. The allowed values for each of the visual elements is encoded in the automated license plate recognition system at setup. In another embodiment the image 503 is an image that shows a stylized image of the plate and the visual elements that have been automatically identified, and, their values. In one embodiment, if the automated system fails to identify an element, the region in the image 503 where that element would appear is blank. In another embodiment, not shown, the question presented to the human reviewer includes both the image 503 and an actual image of the license plate being recognized.

Figure 6:
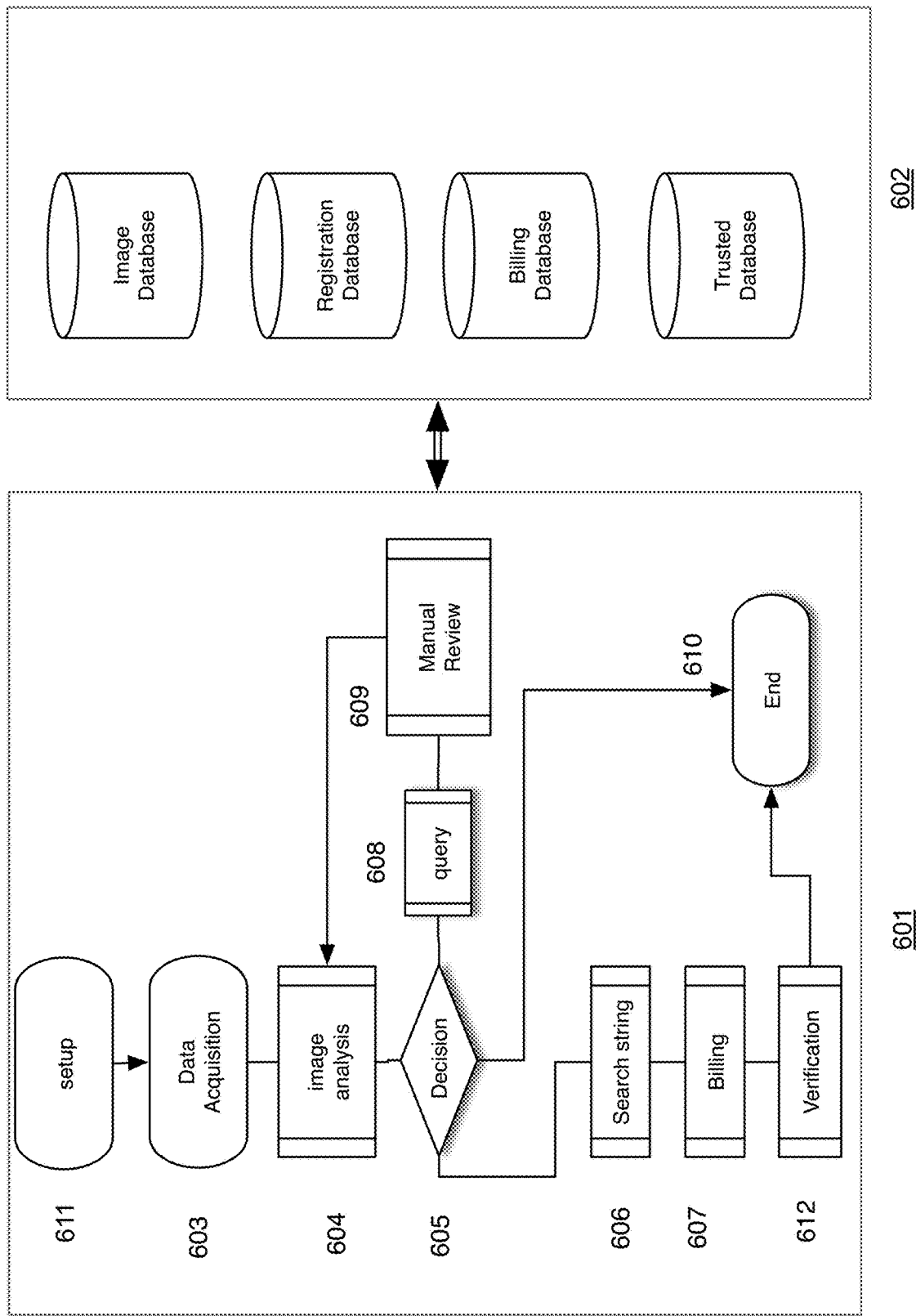
FIG. 6 is a flow and block diagram showing a method for license plate recognition that includes the plate grammar, rules to use the plate grammar, and, integrated guided human review.

FIG. 6 shows a flow chart for a preferred embodiment of the invention. The process starts with a setup procedure 611 where the plate grammar for each of the jurisdictions for which license plate recognition is required, is encoded. Encoding includes determining which of the plate grammar visual elements are required, such that if all elements are known, a database search index for every license plate in the jurisdiction's license plate database can be created. Setup also includes defining a set of rules that relates the content, or value, of each required plate grammar visual element to a database search index for each jurisdiction. In preferred embodiments, setup includes determining allowed values for each of the required plate grammar visual elements. In a preferred embodiment setup further includes identifying the physical location on the license plate image where each of the plate grammar visual elements, if present, is located.

Setup also includes defining an algorithm that will present a prompt to a human reviewer for plate grammar visual elements that cannot be automatically determined through image analysis by a computer. The algorithm for presenting questions or prompts to the human reviewer may include a first set of questions for a novice reviewer and a second set of questions for an expert human reviewer. In a preferred embodiment the algorithm further includes code to present an image of the license plate to the human reviewer as part of the prompt. In one embodiment the image presented is a cropped image of the license plate showing the region of the license plate where an unknown plate grammar visual element may be found. In one embodiment the questions are based upon the plate grammar visual elements, and, the reviewers are presented with a cropped image of a portion of the license plate, and, queried with limited response answers as to whether a particular plate grammar element is present. In some embodiments the choice of responses available to the manual reviewer are: "DEFINITELY OPTION 1", "DEFINITELY OPTION 2", "DEFINITELY NOT EITHER", "MAYBE ONE OF THEM, BUT NOT POSSIBLE TO TELL FOR SURE", and, "I'M NOT SURE HOW TO ANSWER". Setup 611 is completed once for a particular roadway or set of jurisdictions for which automated license plate recognition is required. Setup 611 is updated as jurisdiction update their license plate database with new or modified plate grammar visual elements, allowable content for each of the plate grammar visual elements, or, it is discovered through feedback steps 607, incorporated into the license plate recognition process that errors are being made in the recognition process.

Once setup is complete, data related to individual vehicles' license plates, to be recognized, is acquired 603. Data includes an image of the license plate on the vehicle, and, may further include an image of the vehicle itself, time and date stamps for when the vehicle passed the sensors (see FIG. 1). In some cases additional information may be transmitted from the vehicle to receivers located on the roadway or by sensors located in or along the roadway. The data is routed to an automated license plate recognition process image analysis step 604. The automated process 604 includes image analysis that searches for each of the required plate grammar visual elements as defined in setup 611. The analysis 604 includes determining whether each element is present, and, also identifying the content for that element. As an example, analysis includes determining whether the plate grammar visual element related to jurisdiction is present, and, if so, recognizing the content of that element, the name of the jurisdiction. In the case of the jurisdiction plate grammar element, presence of the element may be related to image quality or other factors such as objects (like license plate frames) obstructing the view for the jurisdiction element. Similarly, analysis 604, includes an automated visual search for all of the required visual elements and their content. In one embodiment the image analysis 604 search by computer is limited to the physical location on the license plate for each plate grammar visual element as defined during setup 611. Once a search for all required elements is completed, a test and decision 605 is made as to whether a database search index can be created that can be presented to the jurisdiction's license plate database. The test and decision step includes determining whether each required element is found, and if so, whether the content or value of the element is known. In some cases, as previously described, presence or absence of a particular plate grammar element does not indicate failure but rather that the plate belongs to a particular category. In some embodiments a confidence level is determined as to whether each plate grammar element is or is not found and, if found, a confidence level for identifying the content of that plate grammar element. In one embodiment, an overall confidence level is determined from that automated image analysis step 604. If all plate grammar elements are found, the process then proceeds to creation of the database search index 606. Creation of the database search index is as described earlier in FIGS. 4A and 4B. The creation of the database search index 606 includes an algorithm that transforms the presence or absence of each plate grammar required element, and, if present the content, into a database search index, in a format used in each of the jurisdiction license plate registration databases. Databases 602 of visual element images, search results, jurisdictions' plate registration databases and previous results are accessed and updated as needed by each of the steps, 603-612. Confidence levels for the automated image analysis 604 may be estimated as described in U.S. patent application Ser. No. 15/683,283, published as US 20190066492 and in U.S. Pat. No. 9,405,988, both including common inventors to this application and included in their entirety in this application. If all of the plate grammar elements for the license plate are uniquely identified with a sufficiently high confidence, the database search index is created and the process continues to billing 607 where the database search index is submitted to the jurisdiction's plate vehicle registration database and the particular license plate is identified within that database as well as an identification of the vehicle owner for which the license plate was issued. The identification of the vehicle owner is further verified 612, in one embodiment by payment, or refusal to pay, a toll bill by the identified owner. The databases 602 are updated with the recognition results, and, in some cases with the acquired data used to identify the vehicle. In one embodiment updating of the databases 602 includes updating the visual elements. Such images and data may then be further used as described above as aids in identifying future occurrences where the same vehicle is a potential identification result from future data acquisition 603.

If the decision 605 does not confirm a high confidence visual element identification, a manual review process 608, 609 may be initiated. A question is automatically created 608. The question may present all or some of the data acquired at the first step 603 as well as data from the databases 602. In a preferred embodiment the question creation 608 includes a subset of the data acquired 603, a selected skill level of the human reviewer to be presented the data in a manual review step 609, and, a question that is tailored to the selected skill level. The selected skill level may be pre-selected by an operator of the system or may be selected based upon availability of reviewers as determined in the question creation step 608. Availability of human reviewers may be determined by a measure of the backlog for manual review for each reviewer. The question is created as previously described in FIG. 5. Once the question is created, the question is presented for manual review 609 through presenting a display to the reviewer as already described above. Upon completion of the manual review 609, the process is routed back to the automated process 604 with the new data provided by the manual review. The automated process then retries to recognize the plate, and, if successful 605, the plate recognition is routed on to creation of the database search index 606, billing 607, confirmation 612, and, completion 610. If unsuccessful, either, a new question for manual review is created 608 and a second or further manual review 609 is completed, or, the decision 605 further includes a test as to whether any further manual review question can be created and if not, the process is stopped 610. The stop process 610 further includes updating databases 602 as to the failure (or success). In one embodiment the stop process 610 includes records of the data acquired 603 such that repeated failures on what might be the same license plate/vehicle can be recorded or that particular queries proved successful.

Figure 7:
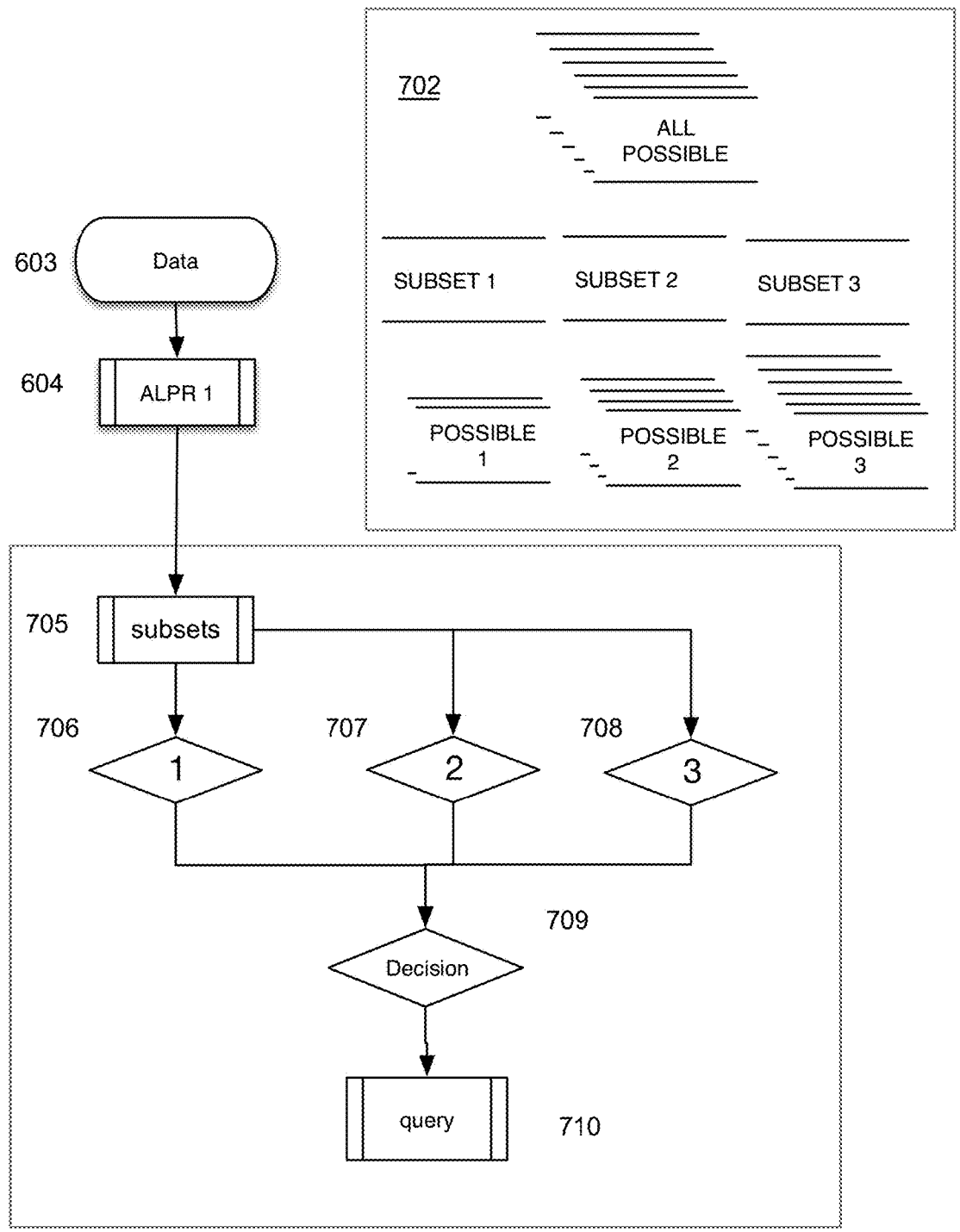
FIG. 7 is a block diagram of a system that automatically optimizes for the shortest path to recognition of a license plate.

In another embodiment, the creation of the question 608 for manual review includes choosing a particular question that will provide a path to successful recognition of the license plate, through creation of the database search index, and, the vehicle. As shown in FIG. 7, in one embodiment, the optimum path is selected on the basis of a question that will provide at least one of:

the smallest population of potential license plates if the question is definitively answered, and, the fewest number of subsequent steps, decided on the basis of looking forward and counting the number of potential identification steps subsequent to each potential question, if answered definitively, and, selecting that question that will, if answered definitively, have the fewest number of subsequent steps.

In another embodiment, the question is selected on the basis of available reviewer's skills (already discussed).

This question creation process is described in FIG. 5. As already described the overall process includes acquiring data 603, that includes license plate image data, and routing that data to an automated process 604. In the example embodiment shown the automated process 604 fails to successfully identify all license plate grammar elements and creation 701 of a question for manual review is initiated. The process selects 705 a set of missing plate grammar elements that are required for successful recognition of the license plate. In the example shown three elements, shown as elements 1, 2 and 3 in the Figure. It is possible, as discussed above, to create a question for any of the missing elements 1-3. However, the three queries might not be equivalent. In one embodiment each of the potential queries are tested 706, 707, 708 and a test and decision is made 709 as to which of the three potential queries should be created 710 and presented for manual review. In one embodiment the test and decision 709 further includes a test as to whether a manual reviewer with the requisite skill set to answer the potential question is available. A second test 709 is made as per the inset diagram 702. Each of the potential queries for missing element 1, 2 or 3 are tested, such that if answered definitively, would each result in a subset (shown as subset 1, 2 and 3) of remaining potential possible population, size depicted as Possible 1, 2 or 3. In the example shown a question for element 1 would result in the smallest (Possible 1) population of remaining potential license plates out of the initial remaining population prior to the question. In such case the question for element 1 would be selected 709 and created 710 and presented or manual review. In another embodiment the sizes of Possible 1, 2 and 3 represent a look ahead, and, anticipated subsequent automated steps count and the question for license plate element 1 is selected on the basis of having the fewest anticipated future steps.

SUMMARY

A license plate recognition process is described that includes automated image analysis integrated with human review, and, a definition of a plate grammar of license plate visual elements that are required to prepare a database search index that enables selection of a particular license plate, from a known population of all possible license plates issued for each and every jurisdiction of interest. The plate grammar includes visual elements that may be searched by both automated image analysis and by a human reviewer. The process includes creation of a set of questions that guides a human reviewer into providing required information regarding a selected plate grammar element that is not identified by computerized image analysis. Integration of a manual review process within an automated process as opposed to manual review solely at a failed completion of the automated process is included. Methods are presented for creation of queries for manual review that take into account the skill and availability of the manual reviewer as well as optimizing for a shortest path to completion of the recognition of the license plate.

What is claimed is:

1. A method for license plate recognition of a first license plate, from a plurality of license plates, each issued by one of a plurality of jurisdictions, and each of the plurality of license plates associated with a database search index, the method consists of:

a) first, selecting a set of visual elements known to appear in images of the plurality of license plates issued by each of the plurality of jurisdictions, each of the set of visual elements having a content, wherein the set of visual elements are selected such that only one database search index is created for each of the plurality of license plates, and, one unique database search index is created for all of the plurality of license plates, and then, b) encoding a computer to create the database search index for each of the plurality of license plates, for each of the plurality of jurisdictions, based upon the set of visual elements and the content of each of the set of visual elements, and, c) encoding the computer to search images of the plurality of license plates issued by each of the plurality of jurisdictions, for each of the visual elements, and, to determine the content for each of the visual elements, and, d) acquiring an image of the first license plate, and, e) using the encoding of the computer, to search the image of the first license plate for each of the set of visual elements and determining the content for each of the visual elements, and, f) using the encoding of the computer, to create the database search index associated with the first license plate, based upon the searching of the image of the first license plate for each of the set of visual elements and determining the content for each of the visual elements, and, g) recognizing the first license plate by matching the database search index created from the first license plate with the database search index associated with each of the plurality of license plates.

2. The method of claim 1 wherein the set of visual elements includes an element for each of: the jurisdiction, a license plate character string, a prefix, a suffix, a series text string, and, a background graphic description.

3. The method of claim 1 wherein the set of visual elements consists of an element for each of: the jurisdiction, a license plate character string, a prefix, a suffix, a series text string, and, a background graphic description.

4. The method of claim 1 wherein the set of visual elements consists of at least three visual elements selected from: an element for the jurisdiction, a license plate character string, a prefix, a suffix, a series text string, and, a background graphic description.

5. The method of claim 1 wherein each of the set of visual elements includes a physical location of the visual element in the images of the plurality of license plates on each of the plurality of license plates.

* * * * *